United States Patent
Nagayama et al.

(10) Patent No.: US 9,350,058 B2
(45) Date of Patent: May 24, 2016

(54) AIR CELL AND ASSEMBLED BATTERY USING THE SAME

(75) Inventors: Mori Nagayama, Yokohama (JP);
Nobutaka Chiba, Yokohama (JP);
Yoshiko Tsukada, Yokohama (JP);
Atsushi Miyazawa, Kamakura (JP)

(73) Assignee: NISSAN MOTOR CO., LTD., Yokohama-Shi, Kanagawa (JP)

( * ) Notice: Subject to any disclaimer, the term of this patent is extended or adjusted under 35 U.S.C. 154(b) by 120 days.

(21) Appl. No.: 14/344,756

(22) PCT Filed: Sep. 13, 2012

(86) PCT No.: PCT/JP2012/073495
§ 371 (c)(1),
(2), (4) Date: Mar. 13, 2014

(87) PCT Pub. No.: WO2013/039159
PCT Pub. Date: Mar. 21, 2013

(65) Prior Publication Data
US 2014/0342250 A1    Nov. 20, 2014

(30) Foreign Application Priority Data

Sep. 15, 2011   (JP) ................................. 2011-201704
Sep. 7, 2012   (JP) ................................. 2012-196728

(51) Int. Cl.
*H01M 12/02*     (2006.01)
*H01M 12/08*     (2006.01)
(Continued)

(52) U.S. Cl.
CPC .............. *H01M 12/02* (2013.01); *H01M 2/208* (2013.01); *H01M 12/065* (2013.01); *H01M 12/08* (2013.01)

(58) Field of Classification Search
CPC ... H01M 2/02; H01M 2/208; H01M 12/0605; H01M 12/08; H01M 2/08; H01M 12/208
See application file for complete search history.

(56) References Cited

U.S. PATENT DOCUMENTS 4,547,438 A    10/1985   McArthur et al.
4,615,954 A *   10/1986   Solomon ............. H01M 4/9008
                                                                                           429/405

(Continued)

FOREIGN PATENT DOCUMENTS

DE      3425172    *   1/1986 ............ H01M 12/06
EP      0294327 A2    12/1988

(Continued)

OTHER PUBLICATIONS

Communication and Extended European Search Report, dated Jan. 22, 2015, from the corresponding European Patent Application No. 12830930.9.

*Primary Examiner* — Patrick Ryan
*Assistant Examiner* — Aaron Greso
(74) *Attorney, Agent, or Firm* — Young Basile Hanlon & MacFarlane P.C.

(57) ABSTRACT

An air cell includes a positive electrode layer, an electrolyte layer stacked on the positive electrode layer, a negative electrode layer stacked on the electrolyte layer and an electroconductive liquid-tight ventilation layer stacked on the positive electrode layer, the electroconductive liquid-tight ventilation layer being positioned on the opposite side of the positive electrode from the electrolyte layer. The assembled battery is provided with a plurality of the air cells described above. The assembled battery is provided with a flow path through which oxygen-containing gas flows interposed between the electrically-conductive liquid-tight ventilation layer of a first air cell and the negative electrode layer of a second air cell adjacent to the first air cell. The first air cell is electrically connected to the negative electrode layer of the second air cell via the electrically-conductive liquid-tight ventilation layer.

12 Claims, 3 Drawing Sheets

(51) Int. Cl.
*H01M 12/06* (2006.01)
*H01M 2/20* (2006.01)

(56) References Cited

U.S. PATENT DOCUMENTS

| | | | | |
|---|---|---|---|---|
| 4,828,939 | A | 5/1989 | Turley et al. | |
| 4,959,280 | A * | 9/1990 | Amthor | H01M 2/1038 429/407 |
| 6,265,094 | B1 * | 7/2001 | Pedicini | H01M 2/0255 429/149 |
| 2002/0137836 | A1 * | 9/2002 | Yanagisawa | B82Y 30/00 524/495 |

FOREIGN PATENT DOCUMENTS

| | | |
|---|---|---|
| EP | 0294327 A3 | 12/1988 |
| JP | 63131474 A | 6/1988 |
| JP | 01320783 A | 12/1989 |
| JP | 06267594 A | 9/1994 |
| JP | H10-055807 * | 2/1998 ............. H01M 4/90 |
| JP | 3034110 B2 | 2/2000 |

* cited by examiner

AIR CELL AND ASSEMBLED BATTERY USING THE SAME

CROSS REFERENCE TO RELATED APPLICATIONS

The present application claims priority to Japanese Patent Application Nos. 2011-201704, filed Sep. 15, 2011; and 2012-196728, filed Sep. 7, 2012; each incorporated herein in its entirety.

TECHNICAL FIELD

The present invention relates to an air cell. The present invention also relates to an assembled battery including a plurality of air cells. More specifically, the present invention relates to an air cell capable of decreasing internal resistance and an assembled battery using the air cell.

BACKGROUND

Air cells are cells using oxygen in air as active materials and are economical power sources usable for a long period of time without maintenance. In general, there are known button cells each having a structure in which a negative electrode metal case is engaged via a gasket with a positive electrode metal case having air holes. In the internal space of the engaged case body, a negative electrode, a separator, an air electrode (a positive electrode), a water-repellent film and an electrolysis solution are placed. In such a button cell, the internal space of the engaged case body is divided by the separator impregnated with the electrolysis solution. One of the divided spaces serves as the negative electrode filled with zinc, and the other serves as the air electrode (the positive electrode) provided with a catalyst. In addition, the water-repellent film of a polytetrafluoroethylene (PTFE) porous film is placed on the opposite side of the separator on the air electrode side.

Japanese Patent 3034110 discloses that a PTFE porous film composing a water-repellent film is subjected to particular treatment in order to improve water removal performance of the water-repellent film and thereby further extend the life of a button cell.

SUMMARY

However, investigations by the inventors revealed that sufficient battery performance of an assembled battery cannot be ensured merely by using a water-repellent film having high water-repellent performance as disclosed in Japanese Patent 3034110 in an air cell used for the assembled battery. This is because such a problem is derived from an increase in internal resistance generally in the water-repellent film, which is not mentioned at all in Japanese Patent 3034110 relating to a button battery.

The present invention has been made in view of the recently-raised problem described above. It is an object of the present invention to provide an air cell capable of decreasing internal resistance and an assembled battery including a plurality of such air cells.

An air cell according to an aspect of the present invention includes: a positive electrode layer; an electrolyte layer stacked on the positive electrode layer; a negative electrode layer stacked on the electrolyte layer; and an electrically-conductive liquid-tight ventilation layer stacked on the positive electrode layer on the opposite side of the electrolyte layer.

An assembled battery according to an aspect of the present invention includes a plurality of air cells according to the aspect of the present invention. A flow path through which oxygen-containing gas flows is interposed between the electrically-conductive liquid-tight ventilation layer of a first air cell and the negative electrode layer of a second air cell adjacent to the first air cell. The first air cell is electrically connected to the negative electrode layer of the second air cell via the electrically-conductive liquid-tight ventilation layer.

BRIEF DESCRIPTION OF DRAWINGS

The description herein makes reference to the accompanying drawings wherein like reference numerals refer to like parts throughout the several views, and wherein.

DESCRIPTION OF EMBODIMENTS

Figure 1:
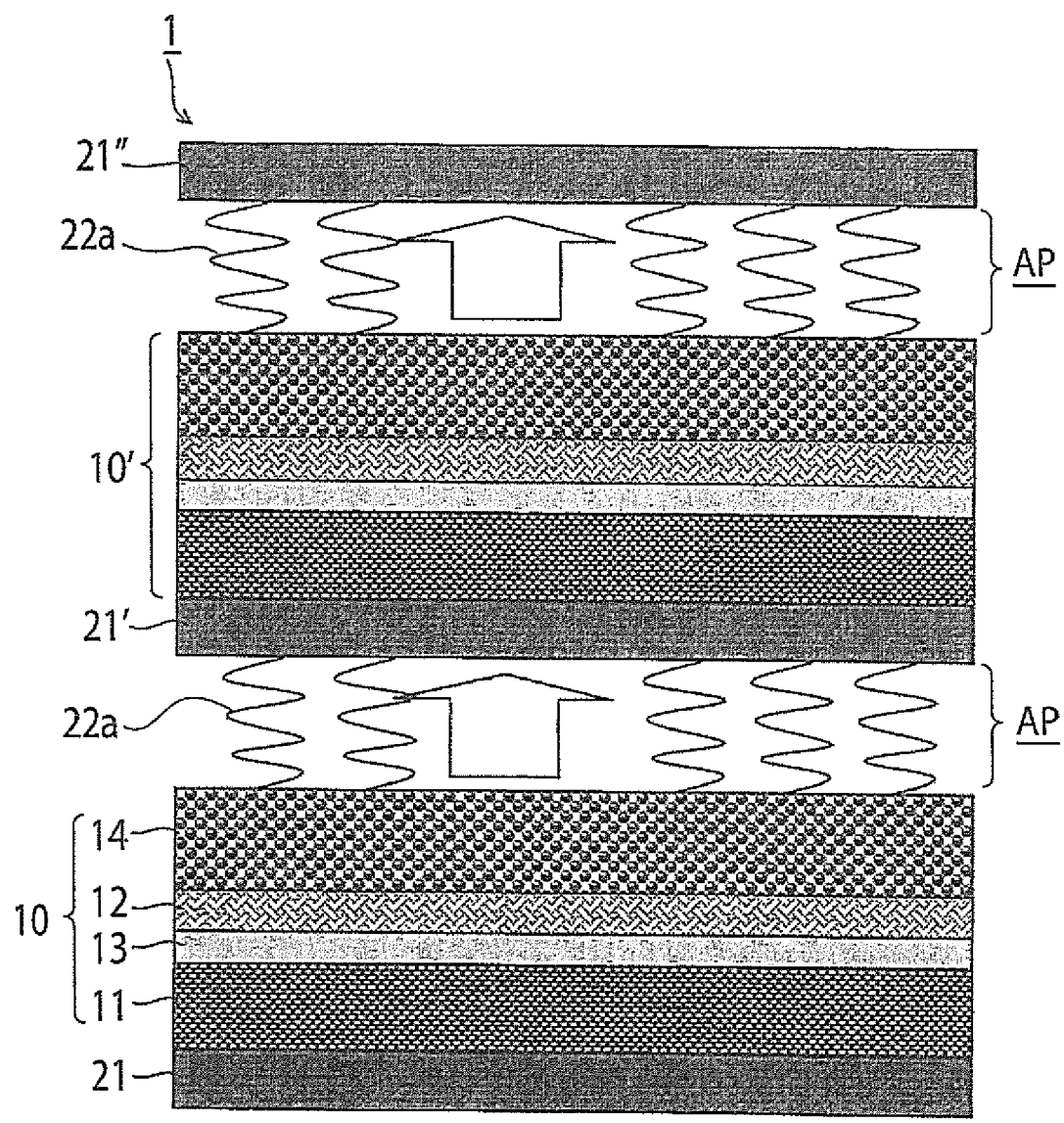
FIG. 1 is a cross-sectional view showing a schematic structure of an assembled battery according to a first embodiment of the present invention.

Hereinafter, an air cell and an assembled battery according to the present invention will be explained in detail with reference to the drawings. It should be noted that dimensional ratios in the drawings are magnified for convenience of explanation and may be different from actual ratios.

[Air Cell] An air cell 10 according to an embodiment of the present invention has a constitution, as shown in FIG. 1, in which a negative electrode layer 11, an electrolyte layer 13 and a positive electrode layer 12 are sequentially stacked on top of one another. The air cell 10 further includes an electrically-conductive liquid-tight ventilation layer 14 stacked on the positive electrode layer 12 on the opposite side of the electrolyte layer 13. Namely, the air cell 10 shown in FIG. 1 includes the positive electrode 12 interposed between the electrically-conductive liquid-tight ventilation layer 14 and the electrolyte layer 13. Here, "the electrically-conductive liquid-tight ventilation layer" is a layer that has electric conductivity and air permeability and functions to isolate a liquid in the electrolyte layer and suppress the movement thereof, thereby preventing the liquid from leaking out of the electrolyte layer. The air cell 10 has a wide conduction path due to such a constitution so as to decrease internal resistance. In this description, "the conduction path" represents a path of a current flowing in the air cell. That is, the direction perpendicular to the stacked surfaces of the respective layers included in the air cell of this embodiment is referred to as "a conduction path direction", and the conduction path extends in this direction.

[Assembled battery] An assembled battery according to an embodiment of the present invention includes a plurality of air cells according to the present invention. The assembled battery is provided with a flow path through which oxygen-containing gas flows interposed between the electrically-conductive liquid-tight ventilation layer of a first air cell and the negative electrode layer of a second air cell adjacent to the first air cell. The first air cell is electrically connected to the negative electrode layer of the second air cell via the electrically-conductive liquid-tight ventilation layer. This constitution can decrease internal resistance in the electrically-conductive liquid-tight ventilation layer and increase the width of the conduction path, and therefore decrease internal resistance. Here, "to connect" includes both series connection and parallel connection. In particular, the series connection can increase the width of the conduction path and decrease the length of the conduction path so as to further decrease the internal resistance.

The assembled battery according to the present embodiment preferably includes an electrically-conductive porous body inside the flow path. Due to this constitution, the positive electrode layer of the first air cell is electrically connected to the negative electrode layer of the other air cell adjacent to the first air cell via the electrically-conductive liquid-tight ventilation layer and the electrically-conductive porous body in the flow path. As a result, the internal resistance can be decreased. The thickness direction of the respective layers in the air cells is preferably substantially parallel to the conduction path direction in the assembled battery, which can decrease the internal resistance of the liquid-tight ventilation layer. Further, the positive electrode layer of the first air cell can be electrically connected to the negative electrode layer of the other air cell adjacent to the first air cell via the electrically-conductive liquid-tight ventilation layer and the electrically-conductive porous body in the flow path. This constitution contributes to increasing the width of the conduction path and decreasing the length of the conduction path, thereby further decreasing the internal resistance. The connection state is preferably series connection in view of the aspect described above.

In the assembled battery according to the present embodiment, the electrically-conductive liquid-tight ventilation layer is preferably an electrically-conductive water-repellent layer having electric conductivity and water-tight air permeability. Here, the water-tight air permeability represents a property with air permeability that isolates an aqueous solution in the electrolyte layer to prevent outward leakage thereof. This constitution contributes to decreasing the internal resistance in the liquid-tight ventilation layer even when the aqueous solution is used as a liquid contained in the electrolyte layer. Accordingly, the width of the conduction path can be increased so as to decrease the internal resistance.

The assembled battery according to the present embodiment preferably includes the electrically-conductive water-repellent layer that contains at least one of an electrically-conductive material having water repellency and a material containing a water-repellent material and an electrically-conductive material. This constitution can decrease the internal resistance in the liquid-tight ventilation layer with no limitation on the configuration of the electrically-conductive material in the electrically-conductive water-repellent layer. Accordingly, the width of the conduction path can be increased so as to decrease the internal resistance.

The assembled battery according to the present embodiment preferably includes the electrically-conductive water-repellent layer that includes a microporous film, a fiber assembly, a fiber structure, or an arbitrary combination thereof. This constitution can decrease the internal resistance in the liquid-tight ventilation layer with no limitation on the structure of the electrically-conductive water-repellent layer. Accordingly, the width of the conduction path can be increased so as to decrease the internal resistance.

The assembled battery according to the present embodiment preferably contains the electrically-conductive material that contains one of or both a fibrous electrically-conductive material and a particulate electrically-conductive material. The internal resistance in the liquid-tight ventilation layer can be decreased due to the electrically-conductive material that is either the fibrous material or the particulate material. Accordingly, the width of the conduction path can be increased so as to decrease the internal resistance.

The assembled battery according to the present embodiment preferably contains the electrically-conductive material that contains one of or both carbon and metal. The carbon or metal having high electric conductivity contributes to further decreasing the internal resistance in the liquid-tight ventilation layer. Accordingly, the width of the conduction path can be increased so as to further decrease the internal resistance.

The assembled battery according to the present embodiment preferably contains the water-repellent material that contains one of or both olefin resin and fluorine resin. The olefin resin or fluorine resin having high water repellency contributes to decreasing the internal resistance in the liquid-tight ventilation layer while preventing a decrease in liquid-tightness. Accordingly, the width of the conduction path can be increased so as to decrease the internal resistance.

The assembled battery according to the present embodiment preferably contains the electrically-conductive porous body that includes a particle assembly, a fiber assembly, a fiber structure, a porous plate, or an arbitrary combination thereof. This constitution can decrease the internal resistance in the liquid-tight ventilation layer. Further, the positive electrode layer of one air cell can be electrically connected to the negative electrode layer of another air cell adjacent to the one air cell via the electrically-conductive liquid-tight ventilation layer provided on the positive electrode layer and via the electrically-conductive porous body in the flow path. This constitution contributes to increasing the width of the conduction path and decreasing the length of the conduction path, thereby further decreasing the internal resistance. The connection state is preferably series connection in view of the aspect described above.

The assembled battery according to the present embodiment preferably contains the electrically-conductive porous body that contains one of or both carbon and metal. The use of carbon and metal having high electric conductivity contributes to further decreasing the internal resistance in the electrically-conductive porous body. Accordingly, the width of the conduction path can be increased so as to further decrease the internal resistance.

In the assembled battery according to the present embodiment, one of or both the electrically-conductive material having water repellency and the water-repellent material preferably contain a material obtained in a manner such that a non-water-repellent material is subjected to water-repellent treatment. The water-repellent treatment may be fluorine treatment. The fluorine treatment is not particularly limited, and conventional fluorine treatment may be used as appropriate depending on the type of the non-water-repellent material. This constitution contributes to decreasing the internal resistance in the liquid-tight ventilation layer with no limitation on the material having water repellency. Accordingly, the width of the conduction path can be increased so as to further decrease the internal resistance.

Hereinafter, several embodiments of the present invention will be explained in detail with reference to the drawings.

First Embodiment

FIG. 1 is a cross-sectional view showing a schematic structure of an assembled battery according to a first embodiment. Arrows shown in FIG. 1 indicate the conduction path direction.

As shown in FIG. 1, an assembled battery 1 of the present embodiment includes a plurality of air cells according to the present invention. A first air cell 10 has a constitution in which a negative electrode layer 11, an electrolyte layer 13, a positive electrode layer 12 and an electrically-conductive water-repellent layer 14 as an example of an electrically-conductive liquid-tight ventilation layer, are sequentially stacked on top of one another. The negative electrode layer 11 is stacked on a negative electrode current collecting layer 21. A second air cell 10' adjacent to the first air cell 10 has of course the same constitution as the first air cell 10. The first air cell 10 and the second air cell 10' in this embodiment are stacked on top of each other via springs 22a and a negative electrode current collecting layer 21' of the second air cell 10'. The springs 22a are an example of a positive electrode current collecting member, and the negative electrode current collecting layers 21, 21' and 21" are an example of a negative electrode layer exterior member. The electrically-conductive water-repellent layer 14 is stacked on the positive electrode layer 12 of the first air cell 10 on the opposite side of the electrolyte layer 13. Namely, the positive electrode 12 is electrically connected to the negative electrode current collecting layer 21' of the second air cell 10' with the electrically-conductive water-repellent layer 14 interposed therebetween. A flow path AP through which oxygen-containing gas flows is formed due to the springs 22a and the negative electrode current collecting layer 21' provided between the electrically-conductive water-repellent layer 14 stacked on the positive electrode layer 12 of the first air cell 10 and the negative electrode layer of the second air cell 10'. This constitution can increase the width of the conduction path while keeping the functions of the air cells in the assembled battery, thereby decreasing internal resistance. The present embodiment has a constitution in which the negative electrode current collecting layer 21' is interposed between the electrically-conductive water-repellent layer 14 stacked on the positive electrode layer 12 of the first air cell 10 and the negative electrode layer 11 of the second air cell 10', which is included in the scope of the present invention. The present embodiment has described the configuration by the series connection but is not limited to this, and parallel connection is also included in the scope of the present invention.

The respective elements are further explained in detail below.

(Negative Electrode Layer) The negative electrode layer 11 contains a negative electrode active material containing a metal substance or an alloy having a normal electrode potential less noble than hydrogen. A porous material may be used in some cases. Examples of the metal substance having the normal electrode potential less noble than hydrogen include lithium (Li), zinc (Zn), iron (Fe), aluminum (Al), magnesium (Mg), manganese (Mn), silicon (Si), titanium (Ti), chromium (Cr), and vanadium (V). Alternatively, an alloy thereof may be used. Here, the alloy is a general term for elements having metallic properties generally obtained in a manner such that at least one metal element or non-metal element is added to a metal element. In particular, an alloy in which at least one metal element or non-metal element is added to the metal element listed above may be used. Examples of the alloy composition include an eutectic alloy in which component elements are individually crystallized and contained as a mixture, a substance in which component elements are completely dissolved to form a solid solution, and a compound of metal elements or a compound of metal and non-metal. The present invention may employ any of these alloy compositions. However, the present invention is not limited to these examples and may employ conventionally-known materials applicable to air cells.

(Positive Electrode Layer) The positive electrode layer 12 has a porous structure and contains, for example, a catalytic component, an electrically-conductive catalyst carrier supporting the catalytic component thereon, and a binder binding the catalytic component. The catalyst carrier and the binder are added as necessary. Hereinafter, a complex in which the catalytic component is supported on the catalyst carrier is also referred to as "an electrode catalyst".

In particular, the catalytic component may be selected from metal such as platinum (Pt), ruthenium (Ru), iridium (Ir), rhodium (Rd), palladium (Pd), osmium (Os), tungsten (W), lead (Pb), iron (Fe), chromium (Cr), cobalt (Co), nickel (Ni), manganese (Mn), vanadium (V), molybdenum (Mo), gallium (Ga), and aluminum (Al), and an alloy of these metals. The alloy composition is the same as described above.

The shape and size of the catalytic component are not particularly limited and may be the same as those of conventionally-known catalytic components. However, the catalytic component is preferably in a particle state. An average particle diameter of the catalyst particles is preferably in the range from 1 nm to 30 nm. The catalyst particles having such an average particle diameter can control the balance of catalyst utilization efficiency and ease of support appropriately. Note that the catalyst utilization efficiency relates to an effective electrode area of an electrode surface on which an electrochemical reaction progresses.

Here, the "average particle diameter of the catalyst particles" may be measured as a crystallite diameter obtained from a full width at half maximum of a diffraction peak of the catalytic component in an X-ray diffraction, or measured as an average value of the particle diameters of the catalytic component investigated with a transmission electron microscope. The catalyst carrier functions as a carrier for supporting the above-mentioned catalytic component, and functions as an electron conduction path involved in communicating electrons between the catalytic component and other members. The catalyst carrier is only required to have a specific surface area sufficient to support the catalytic component in a desired dispersed state and have sufficient electron conductivity. The catalyst carrier preferably contains carbon as a main component. A specific example of the catalyst carrier may be carbon particles containing carbon black, activated carbon, coke, natural graphite, or artificial graphite.

Note that "containing carbon as a main component" denotes that carbon atoms are contained as a main component, and the concept thereof includes a case of "being composed only of carbon atoms and also a case of "being substantially composed of carbon atoms". Here, "being substantially composed of carbon atoms" denotes that approximately 2% to 3% by mass or less of impurities may be contained.

A BET specific surface area of the catalyst carrier may be a specific surface area sufficient to support the catalytic component in a highly dispersed state, and is preferably in the range from 20 to 1600 $m^2/g$, more preferably in the range from 80 to 1200 $m^2/g$. When the specific surface area of the catalyst carrier is within such a range, the balance of dispersibility of the catalytic component on the catalyst carrier and effective utilization efficiency of the catalytic component may be controlled appropriately.

The size of the catalyst carrier is not particularly limited either. In view of ease of support, catalyst utilization efficiency, and regulation of the thickness of the catalyst layer within an appropriate range, an average particle diameter of the catalyst carrier is approximately in the range from 5 nm to 200 nm, preferably approximately in the range from 10 nm to 100 nm. The supported amount of the catalytic component in the electrode catalyst is preferably in the range from 10% to 80% by mass, more preferably in the range from 30% to 70% by mass, with respect to the total amount of the electrode catalyst. Setting the supported amount of the catalytic component to such a range can contribute to appropriately controlling the balance of dispersibility of the catalytic component on the catalyst carrier and catalyst performance. The supported amount of the catalytic component in the electrode catalyst may be measured by inductively coupled plasma atomic emission spectrometry (ICP). However, the present embodiment is not limited to these contents described above and may employ conventionally-known materials applicable to air cells.

The binder is not particularly limited, but the following materials may be used. Examples of the binder include polyethylene (PE), polypropylene (PP), polyethylene terephthalate (PET), polyether nitrile (PEN), polyacrylonitrile (PAN), polyimide (PI), and polyamide (PA). Alternatively, cellulose, carboxymethyl cellulose (CMC), an ethylene-vinyl acetate copolymer, polyvinyl chloride (PVC), styrene-butadiene rubber (SBR), isoprene rubber, butadiene rubber, ethylene-propylene rubber, an ethylene-propylene-diene copolymer, and a styrene-butadiene-styrene block copolymer and a hydrogen additive thereof. Still other examples include a thermoplastic polymer such as a styrene-isoprene-styrene block copolymer and a hydrogen additive thereof, and fluorine resin such as polyvinylidene fluoride (PVDF), polytetrafluoroethylene (PTFE), a tetrafluoroethylene-hexafluoropropylene copolymer (FEP), a tetrafluoroethylene-perfluoro(alkyl vinyl ether) copolymer (PFA), an ethylene-tetrafluoroethylene copolymer (ETFE), polychlorotrifluoroethylene (PCTFE), an ethylene-chlorotrifluoroethylene copolymer (ECTFE), and polyvinyl fluoride (PVF). Further, vinylidenefluoride series fluoro rubber such as vinylidenefluoride-hexafluoropropylene series fluoro rubber (VDF-HFP series fluoro rubber), vinylidenefluoride-hexafluoropropylene-tetrafluoroethylene series fluoro rubber (VDF-HFP-TFE series fluoro rubber), vinylidenefluoride-pentafluoropropylene series fluoro rubber (VDF-PFP series fluoro rubber), vinylidenefluoride-pentafluoropropylene-tetrafluoroethylene series fluoro rubber (VDF-PFP-TFE series fluoro rubber), vinylidenefluoride-perfluoromethylvinylether-tetrafluoroethylene series fluoro rubber (VDF-PFMVE-TFE series fluoro rubber), and vinylidenefluoride-chlorotrifluoroethylene series fluoro rubber (VDF-CTFE series fluoro rubber), and epoxy resin may be used. Among these, polyvinylidene fluoride, polyimide, styrene-butadiene rubber, carboxymethyl cellulose, polypropylene, polytetrafluoroethylene, polyacrylonitrile and polyamide are more preferable. Each of these binders may be used singly, or two or more thereof may be used together.

(Electrolyte Layer) The electrolyte layer 13 includes, for example, an electrolysis solution, and a porous separator as necessary. Examples of the electrolysis solution applied include an aqueous solution and a non-aqueous solution such as potassium chloride, sodium chloride and potassium hydroxide. However, the electrolysis solution is not limited to these examples and may be conventionally-known electrolysis solutions applicable to air cells. When the electrolysis solution is an aqueous solution, examples of the separator include glass paper not subjected to water-repellent treatment, and a microporous film containing polyolefin such as polyethylene and polypropylene. However, the present embodiment is not limited to these examples and may employ conventionally-known materials applicable to air cells.

(Electrically-Conductive Liquid-Tight Ventilation Layer) The electrically-conductive liquid-tight ventilation layer 14 may employ an electrically-conductive water-repellent layer as an appropriate example. The electrically-conductive water-repellent layer has water repellency capable of preventing leakage of the electrolysis solution contained in the air cell and at the same time has a porous structure allowing gas to relatively easily flow therethrough. The electrically-conductive water-repellent layer forms a three-phase interface on the positive electrode to improve reactivity, has electric conductivity and serves as a conduction path. Examples of the electrically-conductive liquid-tight ventilation layer having such a constitution include a layer containing an electrically-conductive material having water repellency and a layer containing a material containing a water-repellent material and an electrically-conductive material. These materials may be used singly or two or more thereof used together. A representative example of the electrically-conductive material having water repellency is an electrically-conductive polymer material. A representative example of the material containing a water-repellent material and an electrically-conductive material is an electrically-conductive polymer material or resin obtained in a manner such that electrically-conductive filler as an electrically-conductive material is added to a non-conductive polymer material.

Examples of the electrically-conductive polymer material include polyaniline, polypyrrole, polythiophene, polyacetylene, polyparaphenylene, polyphenylene vinylene, polyacrylonitrile, and polyoxadiazole. These electrically conductive polymer materials have sufficient electric conductivity even if no electrically conductive material is added thereto.

Examples of the non-conductive polymer material include polyethylene (PE) such as high-density polyethylene (HDPE) and low-density polyethylene (LDPE), olefin resin such as polypropylene (PP), fluorine resin such as polytetrafluoroethylene (PTFE) and polyvinylidene fluoride (PVdF), polyethylene terephthalate (PET), polyether nitrile (PEN), polyimide (PI), polyamide-imide (PAI), polyamide (PA), styrene-butadiene rubber (SBR), polyacrylonitrile (PAN), polymethyl acrylate (PMA), polymethyl methacrylate (PMMA), polyvinyl chloride (PVC), and polystyrene (PS). These non-conductive polymer materials have high potential resistance or solvent resistance. Among these materials, olefin resin or fluorine resin are preferable.

Here, an electrically-conductive material may be added to the electrically-conductive polymer material or the non-conductive polymer material as necessary. Particularly when the resin serving as a substrate contains only a non-conductive polymer, an electrically-conductive material is inevitably added thereto in order to provide the resin with electric conductivity. The electrically-conductive material is not particularly limited as long as it is a substance having electric conductivity. For example, a material having high electric conductivity and potential resistance may be metal or electrically-conductive carbon. Preferable examples of the metal used include at least one metal selected from the group consisting of nickel (Ni), titanium (Ti), aluminum (Al), copper (Cu), platinum (Pt), iron (Fe), chromium (Cr), tin (Sn), zinc (Zn), indium (In), antimony (Sb) and potassium (K), and an alloy or a metal oxide of these metals.

As a preferable example, the electrically-conductive carbon may be at least one material selected from the group consisting of acetylene black, vulcan, black pearls, carbon nanofiber, ketjen black, carbon nanotube, carbon nanohorn, carbon nanoballoon, fullerene, and vapor-grown carbon.

The configuration of the electrically-conductive material is not particularly limited, and one of a fibrous electrically-conductive material and a particulate electrically-conductive material may used singly or both materials may be used together. Alternatively, an electrically-conductive water-repellent layer may be used that is obtained in a manner such that an electrically-conductive porous layer containing the material used for the electrically-conductive polymer material described above or a material used for the electrically-conductive filler, is formed and then subjected to water-repellent treatment such as fluorine treatment. The electrically-conductive water-repellent layer is required to be a porous layer as described above. For example, a microporous film containing a material used for the electrically-conductive filler, or a fiber assembly such as non-woven fabric made from an electrically-conductive polymer material or a non-conductive polymer material may be used for the electrically-conductive water-repellent layer. Another example may be a fiber structure such as woven fabric made from an electrically-conductive polymer material or a non-conductive polymer material.

(Negative Electrode Current Collecting Layer) The negative electrode current collecting layer 21 is not particularly limited as long as it has electric conductivity and prevent the electrolysis solution from leaking out of the air cell. Examples thereof include stainless steel (SUS), copper, a copper alloy, and a material in which a metal surface is plated with metal having corrosion resistance.

(Spring) The springs 22a are not particularly limited as long as they function as a positive electrode current collecting material. An example thereof may be a material containing metal such as stainless steel (SUS), copper or nickel. The present embodiment has exemplified the configuration using the springs 22a but is not limited to such an elastic body. That is, the present embodiment may employ any material as long as it functions as the electrically-conductive liquid-tight ventilation layer. A non-elastic body having a shape similar to the springs 22a and having a current collecting capacity may be substituted for the springs 22a.

The present embodiment can increase the width of the conduction path and decrease the length of the conduction path so as to decrease internal resistance due to the following constitutions (1) to (4).

(1) The electrically-conductive liquid-tight ventilation layer is stacked on the positive electrode layer of the first air cell on the opposite side of the electrolyte layer. The electrically-conductive liquid-tight ventilation layer contains an electrically-conductive material having water repellency, which is obtained in a manner such that microporous carbon is subjected to fluorine treatment. The positive electrode layer of the first air cell is electrically connected to the negative electrode layer of the second air cell adjacent to the first air cell via the electrically-conductive liquid-tight ventilation layer.

(2) The flow path through which oxygen-containing gas flows is formed between the electrically-conductive liquid-tight ventilation layer stacked on the positive electrode layer of the first air cell and the negative electrode layer of the second air cell adjacent to the first air cell.

(3) The flow path is provided inside thereof with the metal springs not an electrically-conductive porous body. The thickness direction of the respective layers in the air cells is substantially parallel to the conduction path direction in the assembled battery.

(4) Since the electrically-conductive liquid-tight ventilation layer is an electrically-conductive water-repellent layer having electric conductivity and water-tight air permeability, a common aqueous solution may be used as a liquid contained in the electrolyte layer.

Second Embodiment

Figure 2:
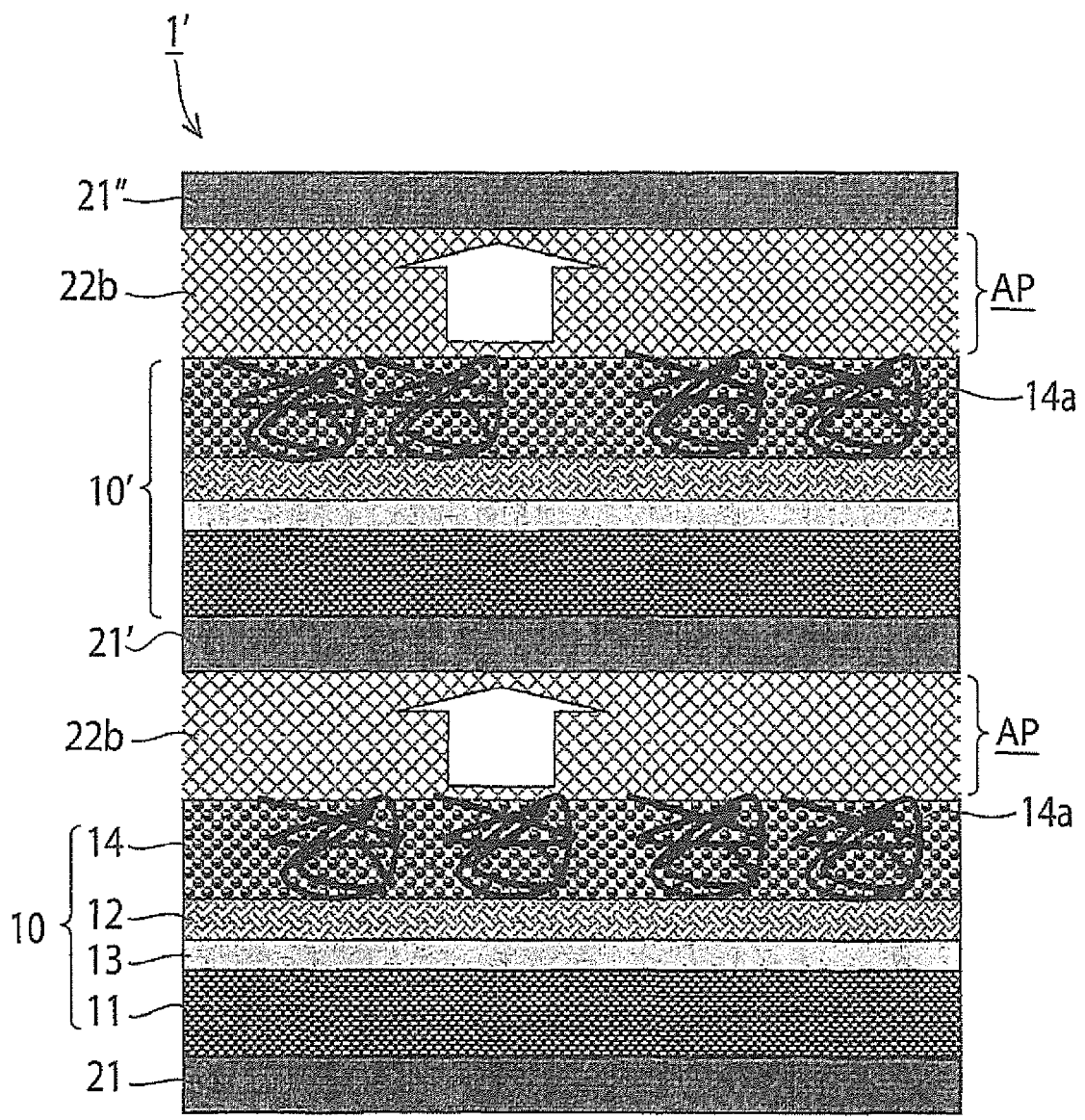
FIG. 2 is a cross-sectional view showing a schematic structure of an assembled battery according to a second embodiment of the present invention.

FIG. 2 is a cross-sectional view showing a schematic structure of an assembled battery according to a second embodiment. Arrows shown in FIG. 2 indicate the conduction path direction. The same elements as those described in the first embodiment are indicated by the same reference numerals, and overlapping explanations thereof are not repeated.

As shown in FIG. 2, an assembled battery 1' of the present embodiment differs from the assembled battery 1 according to the first embodiment in the constitutions of the positive electrode current collecting member and the electrically-conductive water-repellent layer. That is, the present embodiment employs meshes 22b made of stainless steel (SUS) as an electrically-conductive porous body as an example of the positive electrode current collecting member. The electrically-conductive water-repellent layer 14 is obtained in a manner such that a mixture of non-woven fabric of olefin resin and carbon fibers 14a is subjected to fluorine treatment.

The electrically-conductive porous body 22b may be a particle assembly such as a metal powder sintered body. Other applicable examples thereof include a fiber assembly such as non-woven fabric of metal fibers, carbon fibers and electrically-conductive resin fibers, and a fiber structure such as woven fabric or mesh of metal fibers, carbon fibers and electrically-conductive resin fibers. Further, a porous plate such as a punched metal or an expanded metal may also be used. However, the electrically-conductive porous body is not limited to these examples, and conventionally-known current collecting members may be used as appropriate.

The present embodiment can increase the width of the conduction path and decrease the length of the conduction path so as to decrease internal resistance due to the following constitutions (1) to (4).

(1) The electrically-conductive liquid-tight ventilation layer is stacked on the positive electrode layer of the first air cell on the opposite side of the electrolyte layer. The electrically-conductive liquid-tight ventilation layer contains a water-repellent material and an electrically-conductive material. Namely, the electrically-conductive liquid-tight ventilation layer is obtained in a manner such that non-woven fabric of olefin resin is mixed with carbon fibers, and the mixture is subjected to fluorine treatment. The positive electrode layer of the first air cell is electrically connected to the negative electrode layer of the second air cell adjacent to the first air cell via the electrically-conductive liquid-tight ventilation layer.

(2) The flow path through which oxygen-containing gas flows is formed between the electrically-conductive liquid-tight ventilation layer stacked on the positive electrode layer of the first air cell and the negative electrode layer of the second air cell adjacent to the first air cell.

(3) The flow path is provided inside thereof with the meshes of stainless steel (SUS) as an example of an electrically-conductive porous body. The thickness direction of the respective layers in the air cells is substantially parallel to the conduction path direction in the assembled battery.

(4) Since the electrically-conductive liquid-tight ventilation layer is an electrically-conductive water-repellent layer having electric conductivity and water-tight air permeability, a common aqueous solution may be used as a liquid contained in the electrolyte layer.

Third Embodiment

Figure 3:
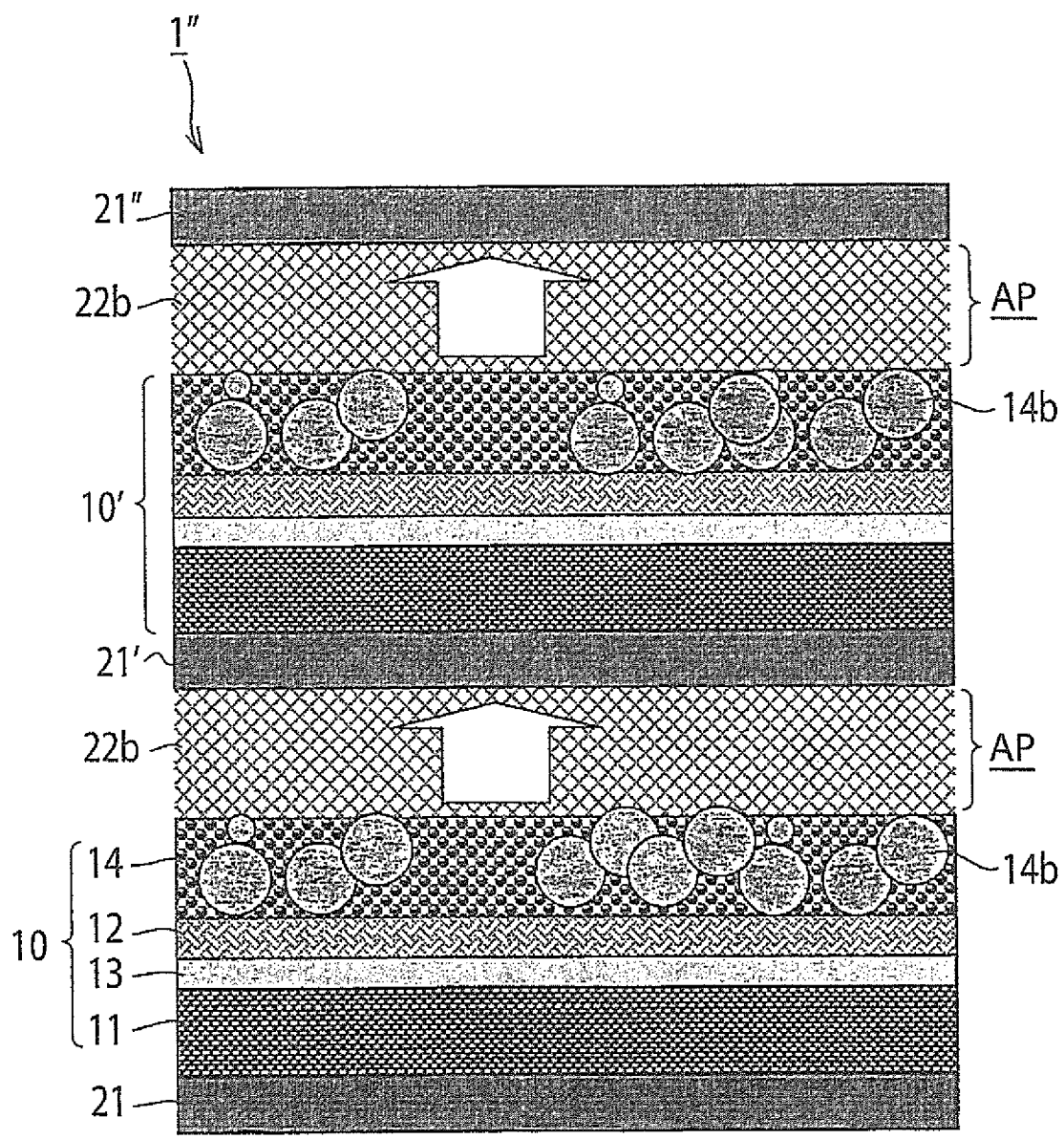
FIG. 3 is a cross-sectional view showing a schematic structure of an assembled battery according to a third embodiment of the present invention.

FIG. 3 is a cross-sectional view showing a schematic structure of an assembled battery according to a third embodiment. Arrows shown in FIG. 3 indicate the conduction path direction. The same elements as those described in the first embodiment are indicated by the same reference numerals, and overlapping explanations thereof are not repeated.

As shown in FIG. 3, an assembled battery 1" of the present embodiment differs from the assembled battery 1 according to the first embodiment in the constitutions of the positive electrode current collecting member and the electrically-conductive water-repellent layer. That is, the present embodiment employs the meshes 22b made of stainless steel (SUS) as the positive electrode current collecting member. The electrically-conductive water-repellent layer 14 is obtained in a manner such that a mixture of non-woven fabric of olefin resin and carbon particles 14b is subjected to fluorine treatment.

The present embodiment can increase the width of the conduction path and decrease the length of the conduction path so as to decrease internal resistance due to the following constitutions (1) to (4).

(1) The electrically-conductive liquid-tight ventilation layer is stacked on the positive electrode layer of the first air cell on the opposite side of the electrolyte layer. The electrically-conductive liquid-tight ventilation layer contains a water-repellent material and an electrically-conductive material. Namely, the electrically-conductive liquid-tight ventilation layer is obtained in a manner such that non-woven fabric of olefin resin is mixed with carbon particles, and the mixture is subjected to fluorine treatment. The positive electrode layer of the first air cell is electrically connected to the negative electrode layer of the second air cell adjacent to the first air cell via the electrically-conductive liquid-tight ventilation layer.

(2) The flow path through which oxygen-containing gas flows is formed between the electrically-conductive liquid-tight ventilation layer stacked on the positive electrode layer of the first air cell and the negative electrode layer of the second air cell adjacent to the first air cell.

(3) The flow path is provided inside thereof with the meshes of stainless steel (SUS) as an example of an electrically-conductive porous body. The thickness direction of the respective layers in the air cells is substantially parallel to the conduction path direction in the assembled battery.

(4) Since the electrically-conductive liquid-tight ventilation layer is an electrically-conductive water-repellent layer having electric conductivity and water-tight air permeability, a common aqueous solution may be used as a liquid contained in the electrolyte layer.

Although the present invention has been described above by reference to the embodiments, the present invention is not limited to the descriptions thereof, and it will be apparent to those skilled in the art that various modifications and improvements can be made.

For example, the specific constitutions of the electrically-conductive water-repellent layer and the positive electrode current collecting member may be modified. In addition, the constitution of one embodiment of the present invention may be combined with that of any other embodiment.

According to the present invention, the assembled battery including the plural air cells each including the positive electrode layer, the electrolyte layer, the negative electrode layer and the electrically-conductive liquid-tight ventilation layer, has the following constitutions (1) and (2). Accordingly, the present invention can provide an assembled battery capable of decreasing internal resistance. The constitutions are as follows: (1) the flow path through which oxygen-containing gas flows is interposed between the electrically-conductive liquid-tight ventilation layer of the first air cell and the negative electrode layer of the second air cell adjacent to the first air cell; and (2) the first air cell is electrically connected to the negative electrode layer of the second air cell via the electrically-conductive liquid-tight ventilation layer.

The invention claimed is:

1. An assembled battery comprising a plurality of air cells, the air cells each including:
   a positive electrode layer;
   an electrolyte layer stacked on the positive electrode layer;
   a negative electrode layer stacked on the electrolyte layer; and
   an electrically-conductive liquid-tight ventilation layer stacked on the positive electrode layer on an opposite side of the electrolyte layer,
   wherein a flow path through which oxygen-containing gas flows is interposed between the electrically-conductive liquid-tight ventilation layer of a first air cell and the negative electrode layer of a second air cell adjacent to the first air cell, and
   the first air cell is electrically connected to the negative electrode layer of the second air cell via the electrically-conductive liquid-tight ventilation layer and an electrically-conductive porous body located in the flow path and directly connected electrically to the electrically-conductive liquid-tight ventilation layer, the electrically-conductive porous body including a first side facing the electrically-conductive liquid-tight ventilation layer and an opposite second side, wherein substantially the entire first side is in direct electrical contact with the electrically-conductive liquid-tight ventilation layer.

2. The assembled battery according to claim 1, wherein a thickness direction of the layers in the air cells is parallel to a conduction path direction in the assembled battery.

3. The assembled battery according to claim 2, wherein the electrically-conductive porous body is at least one material selected from the group consisting of a particle assembly, a fiber assembly, a fiber structure and a porous plate.

4. The assembled battery according to claim 2, wherein the electrically-conductive porous body contains at least one of carbon and metal.

5. The assembled battery according to claim 1, wherein the electrically-conductive liquid-tight ventilation layer is an electrically-conductive water-repellent layer having electric conductivity and water-tight air permeability.

6. The assembled battery according to claim 5, wherein the electrically-conductive water-repellent layer contains at least one material selected from the group consisting of a microporous film, a fiber assembly and a fiber structure.

7. The assembled battery according to claim 5, wherein the electrically-conductive water-repellent layer contains at least one of an electrically-conductive material having water repellency and a material containing a water-repellent material and an electrically-conductive material.

8. The assembled battery according to claim 7, wherein the electrically-conductive material is at least one of a fibrous electrically-conductive material and a particulate electrically-conductive material.

9. The assembled battery according to claim 7, wherein the electrically-conductive material contains at least one of carbon and metal.

10. The assembled battery according to claim 7, wherein the water-repellent material contains at least one of olefin resin and fluorine resin.

11. The assembled battery according to claim 7, wherein at least one of the electrically-conductive material having water repellency and the water-repellent material contains a material obtained in a manner such that a non-water-repellent material is subjected to water-repellent treatment.

12. The assembled battery according to claim 11, wherein the water-repellent treatment is fluorine treatment.

\* \* \* \* \*